Dec. 6, 1960 R. P. OSBORN 2,963,637

VOLTAGE REGULATOR

Filed Dec. 3, 1956

INVENTOR.

BY Ralph P. Osborne,

Edw. A. Osm.

AGENT.

2,963,637
Patented Dec. 6, 1960

2,963,637

VOLTAGE REGULATOR

Ralph P. Osborn, Culver City, Calif., assignor to Hughes Aircraft Company, Culver City, Calif., a corporation of Delaware Filed Dec. 3, 1956, Ser. No. 627,537
7 Claims. (Cl. 323—22)

Figure 1:
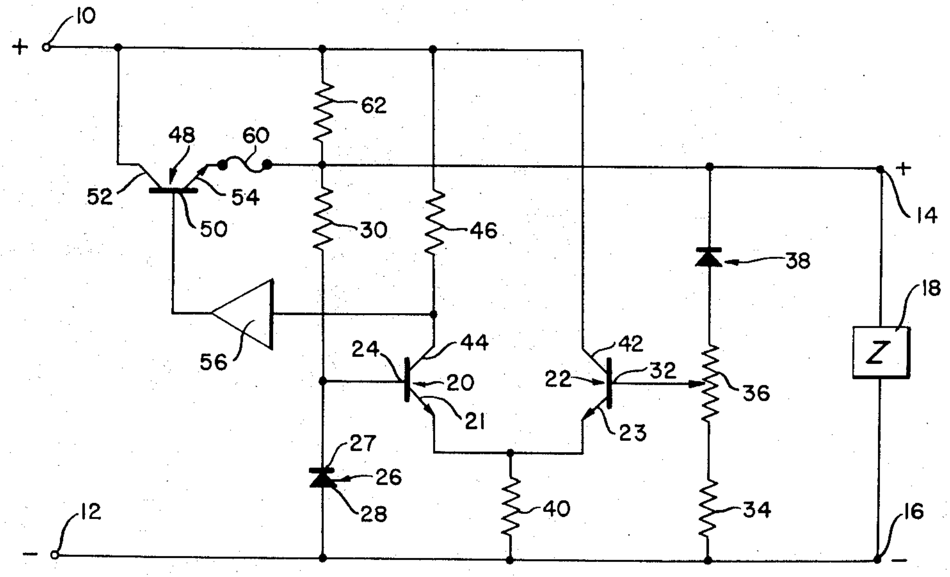

The present invention relates to regulated voltage supplies and more particularly to a voltage regulator utilizing semiconductor signal amplifiers.

Voltage regulators for providing a substantially constant output voltage in response to a nonconstant or unregulated input voltage and utilizing transistors for the control function are known in the prior art. Thus a regulated voltage may be derived from an unregulated voltage source by connecting a transistor in series between the load circuit and the unregulated supply to control the current flow from the unregulated source to the load. The state of conduction of the series transistor may be controlled with an amplifier sensitive to variations in the output voltage supplied to the load. However, in prior art regulators using this general type control a shorting of the output terminals may cause an excessive amount of current to flow through the series transistor and consequently may seriously damage the transistor.

It is therefore an object of the present invention to provide an improved voltage regulator utilizing semiconductor signal amplifiers.

It is a further object of the present invention to provide a voltage regulator utilizing transistors and adapted to protect the transistors in the event of a shorting of the output terminals or of the load of the voltage regulator.

In accordance with the present invention the current flow from an unregulated voltage supply to a load element is controlled by a transistor connected in series between the unregulated voltage supply and the load. The state of conduction of the series transistor, and thus the current flow through the transistor, is varied inversely with variations in the voltage supplied to the load. To this end a first network is connected in parallel with the load to provide a first point of reference potential which varies in accordance with variations in the voltage supplied to the load. A second network is also connected in parallel with the load and provides a second point of reference potential which is substantially constant in spite of variations in the voltage supplied to the load. A differential comparator amplifier is then coupled to the first and second points of reference potential to provide an error signal proportional to voltage variations of the first point of reference potential. This error signal is then amplified and applied to the series transistor in a manner such that the current flow through the transistor is increased or decreased inversely with an increase or decrease of the voltage supplied to the load.

The differential comparator amplifier and the error signal amplifier which applies the error signal to the series transistor are so adapted that when the differential amplifier becomes inoperative the series transistor is rendered non-conductive. By having the two points of reference potential to which the differential amplifier is coupled derived from the output voltage of the regulator the comparator amplifier is rendered nonconductive or inoperative when the output voltage is reduced to zero. Thus the series transistor is rendered nonconductive and protected from current overloads when the signal output terminals are shorted or the load reduced to zero.

Since the reference voltages for the comparator amplifier are derived from the output voltage of the regulator the regulator remains inoperative until sufficient potential is present to cause the differential amplifier to be operative again. In view of the fact that the series transistor is rendered nonconductive during a short circuit condition of the signal output terminals there can be no potential difference between the output terminals until the series transistor is rendered conductive. Therefore, a dropping resistor is placed in parallel with the series transistor between a signal input terminal and a signal output terminal. This allows a small amount of current to bypass the nonconducting transistor and therefore supply sufficient bias to the differential comparator amplifier to place the regulator in operation again after the short circuit condition is corrected. Since this dropping resistor in effect shunts the series transistor its value is selected such that only a small amount of current flows through the resistor during normal operation in order not to impair the regulation characteristics of the regulator. To prevent any impairment of the regulation, the shunting resistor may be removed from the circuit once the regulator has returned to normal operation.

The novel features that are considered characteristic of this invention are set forth with particularity in the appended claims. The invention itself, however, both as to its organization and method of operation, as well as additional objects and advantages thereof, will be best understood from the following description when read in connection with the accompanying drawing in which, Fig. 1 is a schematic circuit diagram, partially in block form, illustrating an embodiment of the voltage regulator of the present invention; and Fig. 2 is a schematic circuit diagram of a preferred embodiment of the voltage regulator of the present invention and illustrating in detail the elements shown in block form in Fig. 1 and also illustrating a refinement of the circuit of Fig. 1.

Figure 2:
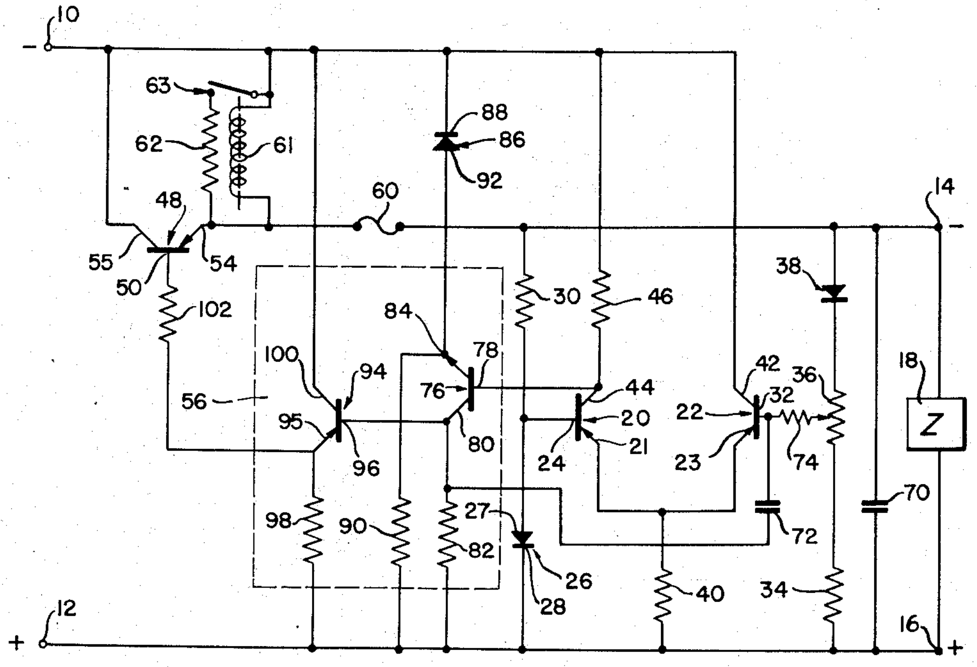

Referring now to the drawing and in particular to Fig. 1, there is shown a schematic circuit diagram, which is partially in block form, of the voltage regulator of the present invention. A pair of signal input terminals 10 and 12 is adapted to be connected to an unregulated voltage source with the signal input terminal 10 being shown to receive a positive potential and signal input terminal 12 adapted to receive a negative input voltage. The regulated voltage derived from the voltage regulator of the invention is supplied to a load 18, illustrated in block form and identified by Z, connected between a pair of signal output terminals 14 and 16. The current from the unregulated source passes through a transistor 48 connected in series with the load 18. A pair of semiconductor signal amplifiers 20 and 22, shown as NPN transistors by the accepted symbol, are the active circuit elements of a differential comparator amplifier which is utilized to provide a signal proportional to variations in the voltage between the signal output terminals 14 and 16.

To obtain a signal which is proportional to any output voltage variation, the base electrode 24 of the transistor 20 is maintained at a substantially constant voltage and the base electrode 32 of the transistor 22 is maintained at a potential which varies in accordance with potential variations applied to the load 18. The base electrode 24 of the transistor 20 is maintained at a substantially constant voltage by means of a first network including a Zener diode 26 connected to operate in its Zener region. That is, the diode is so connected that conventional current flow is from cathode to anode and thus the well-known characteristic of a Zener diode to have a substantially constant voltage drop for a wide current range is used to provide a first point of reference potential. This first point of reference potential is substantially constant in spite of variations in the output voltage of the regulator. In order that current flow through the diode 26 is from cathode to anode the cathode 27 is connected to the positive output terminal 14 through a dropping resistor 30 and its anode 28 is connected directly to the negative output terminal 16. The base electrode 32 of the transistor 22 is maintained at a potential which varies in accordance with output voltage variations by a second voltage divider network which includes a pair of dropping resistors 34 and 36 connected in series with a second Zener diode 38, also operating in its Zener region. The diode 38 serves to reduce the input impedance to the base 32 of transistor 22.

The two dropping resistors 34 and 36 and the diode 38 form a series network which is in parallel with the load 18, and therefore any variation in the voltage applied to the load causes a concomitant variation in the potential of the base electrode 32.

The connection between the base electrode 32 and the second voltage divider network is shown as being variable to permit adjustment of the circuit to set the nominal output voltage to any desired value. The emitters 21 and 23 of the two transistors 20 and 22 are connected directly to each other and are also coupled to the negative output terminal 16 through a common emitter dropping resistor 40. The collector electrode of transistor 22 is connected directly to the positive input terminal 10 and the collector electrode 44 is coupled to the positive input terminal through a load resistor 46. Thus when the regulator is in operation the bias upon the transistors 20 and 22 is such that both transistors are conducting. Any variation in the relative conductivity of the transistor 22 brought about by the base voltage variation on the base 32 causes a voltage variation of the collector 44 of transistor 20. That is, an increase in the potential difference between the output terminals will cause the base 32 of transistor 22 to become more positive. This increases the current flow through transistor 22 and decreases the current flow through transistor 20 causing the collector electrode 44 to become more positive. It is thus seen that variations in the potential difference between the output terminals 14 and 16 causes a voltage variation of the collector 44 of transistor 20.

Current flow to the load 18 must pass through the series transistor 48 having a base 50, a collector 52, and an emitter 54. Therefore the amount of current supplied to the load 18 is controlled by the current flow through the series transistor 48. An inverting amplifier 56, illustrated in block form, is connected between the base 50 of the series transistor 48 and the collector 44 of the transistor 20. Thus any voltage change at the collector 44 is inverted and amplified by the inverting amplifier 56 and applied to the base 50 to control the conduction of the series transistor 48.

When the regulator is in operation the base electrodes 24 and 32 of the two transistors 20 and 22 are more positive than the emitter electrodes 21 and 23 and therefore these two transistors will be conducting. Thus the collector electrode 44 will be at a potential which is less positive than the input terminal 10 and the bias applied to the base electrode 50 of the series transistor 48 by the inverting amplifier will cause a forward bias for the series transistor such that a controlled amount of current is passing through the series transistor 48 from collector to emitter.

In the event of an increase in the potential difference between the output terminals 14 and 16 the base 32 of the transistor 22 becomes more positive causing the transistor 22 to become more conductive. The increase in conduction causes the emitter electrodes 21 and 23 to become more positive. Since the base electrode 24 of the transistor 20 is maintained at a substantially constant voltage in spite of variations and the potential difference beween the output terminals the forward base-emitter bias of the transistor 20 is decreased causing the transistor 20 to be less conductive and the collector electrode 44 to become more positive. The positive change in potential of the collector electrode 44 is inverted and amplified by the inverting amplifier 56 to cause a fall in potential of the base 50 of the series transistor 48. This reduces the forward base-emitter bias of the transistor 48 and decreases the amount of current flow from emitter to collector through the series transistor.

Since the current passing through the load must pass through the series transistor, such a reduction in current flow corrects the assumed increase in potential difference between the output terminals. In the event of a decrease of the potential difference between the signal output terminals 14 and 16 the base electrode of the transistor 22 becomes more negative and in a manner similar to that just described, the base electrode 50 of the series transistor 48 is made more positive. This increases the current conduction of the series transistor 48 and thus more current flows to the load, correcting the assumed reduction in output voltage.

If the signal output terminal 14 is connected directly to the signal output terminal 16 (that is, a direct short circuit) the reference voltages to the base elecrodes 24 and 32 of the two transistors 20 and 22, which compose the active portion of the differential comparator amplifier, are suddenly reduced to zero. Since both of these transistors are normally conducting, the sudden change in potential upon both bases renders both devices nonconductive and causes the collector electrode 44 of the transistor 20 to become substantially equal to the potential of the input terminal 10. This sudden increase in potential of the collector electrode 44 causes a large positive input signal to the inverting amplifier 56, which, in turn, results in the application of a negative potential to the base electrode 50 of the series transistor 48, causing that transistor to become nonconductive. This then prevents any current overload which would tend to damage the series transistor.

To protect the series transistor 48 from excessive currents which might result from a mere reduction in the load appearing between the output terminals 14 and 16 (that is, a substantial reduction in impedance which is still less than a direct short circuit) a fuse element 60 may be connected in series with the emiter 54 of the transistor 48 and the output terminal 14.

After the short-circuit condition has been corrected, the regulator tends to remain inoperative since the reference voltage for the comparator amplifier is zero and a zero forward bias therefore remains applied to the series transistor 48. To bring the regulator back to operation, a dropping resistor 62 is connected in parallel with the series transistor 48 between the input terminal 10 and the output terminal 14. This allows enough current to flow through the two networks which are in parallel with the load to provide the differential comparator amplifier with reference voltages. The comparator amplifier then becomes operative following correction of the short circuit condition at the output terminals. The value of the dropping resistor 62 must be low enough to permit enough current to flow to start this action. On the other hand the resistance of the resistor 62 should be kept at as high a value as possible since the resistor 62 shunts the series transistor 48 and therefore might cause the voltage regulation to suffer during conditions of small current flow through the load 18. To eliminate the detrimental effect of the dropping resistor 62 during low current drain conditions, the circuit of Fig. 2 may be used. This will be explained in detail in conjunction with the explanation of Fig. 2.

In Fig. 2, components similar to those in Fig. 1 are identified by like reference characters. In addition to the components of the circuit of Fig. 1 there are included in detail the circuit elements which make up the inverting amplifier 56 as well as an automatic arrangement of having the shunting resistor 62 in the circuit only during conditions of a direct short circuit at the output terminals 14 and 16. A pair of filtering capacitors 70 and 72 are also included in the circuit of Fig. 2. The filtering capacitor 70 is connected directly between the output terminals 14 and 16 to smooth any small variations in the output voltage. The filtering capacitor 72 is connected between the base 32 of the transistor 22 and the collector electrode 80 of a first transistor 76 which is part of the inverting amplifier. The filtering capacitor 72 in conjunction with a parasitic suppressor resistor 74, connected between the base electrode 32 and the dropping resistor 36, prevent oscillations which might occur within the comparator amplifier.

In Fig. 2 the signal input terminal 10 is shown as being adapted to receive a negative input voltage and the terminal 12 adapted to receive a positive input voltage. The polarity of the output terminals 14 and 16 is also reversed from that shown in Fig. 1. That is, terminal 14 is negative and terminal 16 is positive. The series transistor 48 is therefore shown as a PNP transistor having a collector 55 connected directly to the negative input terminal 10, an emitter 54 connected directly with the negative output terminal 14, and a base 50 coupled to the inverting amplifier 56 through a dropping resistor 102. The two transistors 20 and 22 which compose the active elements of the differential amplifier are likewise shown as PNP transistors. The transistor 22 has a collector 42 connected directly with the negative input terminal 10, an emitter 23 coupled to the positive output terminal 16 through a common emitter dropping resistor 40, and a base 32 coupled to a first resistive network through a parasitic suppressor 74. This first network includes the pair of dropping resistors 34 and 36 connected in series with the Zener diode 38, with the entire network being connected between the output terminals 14 and 16 and thus in parallel with the load 18. The transistor 20 has a collector 44 coupled to the negative input terminal 10 through the load resistor 46, an emitter 21 connected to the emitter 23 of the transistor 22 and also to the positive output terminal 16 through the common emitter dropping resistor 40, and a base electrode 24 connected to a point of substantially constant voltage provided by a second network. The second network includes the dropping resistor 30 connected in series with the Zener diode 26 having its cathode 28 connected directly to the positive output terminal 16. The second network is connected between the signal output terminals 14 and 16 and is adapted to maintain the base 24 of transistor 20 at a substantially constant voltage in spite of variations in the voltage applied to the load 18. It is to be noted that the substantially constant voltage at which the base electrode 24 is maintained will be reduced to zero in the event of a direct short circuiting of the output terminals 14 and 16.

The inverting amplifier 56 includes the first transistor 76 as shown as an NPN transistor having a base electrode 78 connected to the collector electrode 44 of transistor 20, an emitter electrode 84 coupled to the negative signal input terminal 10 through a diode 86, and a collector electrode 80 coupled to the positive signal input terminal 12 through the dropping resistor 82. The emitter electrode 84 is also coupled to the positive input terminal 12 through an impedance element such as a resistor 90. The impedance element 90 and the diode 86 having an anode 92 connected directly to the emitted electrode 84 and a cathode 88 connected directly to the negative input terminal 10, serve to maintain the emitter electrode 84 always at a potential which is slightly more positive than the negative input terminal 10. Thus when the transistor 20 of the differential comparator amplifier is not conducting the emitter electrode 84 of the transistor 76 will be slightly positive with respect to the base electrode 78 and therefore the transistor 76 will be back-biased and non-conductive.

A second transistor 94 included in the inverting amplifier 56 is shown as a PNP transistor, and has an emitter electrode 95 coupled to the positive input terminal 12 through a dropping resistor 98, a collector electrode 100 connected directly to the negative input terminal 10, and a base electrode 96 connected directly to the collector electrode 80 of the first transistor 76. The emitter electrode 95 is also coupled to the base electrode 50 of the series transistor 48 through a dropping resistor 102 and therefore the potential of the emitter 95 serves to control the current flow through the series transistor 48.

In the event of a decrease in the potential difference between the output terminals 14 and 16 the base electrode 32 of the transistor 22 becomes more positive and reduces the current flow through transistor 22. This causes the transistor 20 of the differential comparator amplifier to conduct more heavily in the manner previously explained. The increase in current flow through the transistor 20 causes the collector 44 to become more positive. Since the collector 44 is connected directly to the base 78 of the NPN transistor 76, that transistor becomes more conductive causing its collector 80 to become more negative. Since the collector electrode 80 is connected directly to the base electrode 96 of the second transistor in the inverting amplifier the negative change in potential upon the collector 80 causes the base electrode 96 to become more negative. Thus the PNP transistor 94 becomes more conductive. Since this transistor is operating essentially as an emitter follower the negative signal upon the base 96 causes the emitter 95 to become more negative. Since the emitter 95 is coupled to the base electrode of the series transistor 48 through the dropping resistor 102 the base electrode 50 becomes more negative and the series transistor becomes more conductive. This then allows more current to flow to the load 18 which corrects for the assumed decrease in the potential difference between the output terminals 14 and 16.

In the circuit of Fig. 2 the shunting resistor 62 is placed in the circuit only when the signal output terminals 14 and 16 are short circuited. During a condition of direct short circuiting of the output terminals the full voltage applied between the signal input terminals 10 and 12 is applied across a solenoid 61 which is adapted to close a switch 63 only when the full potential of the input voltage source is applied thereacross. As soon as the switch 63 is closed the shunting resistor 62 is placed in parallel with the series transistor 48. That is, one end of the shunting resistor 62 is then connected electrically directly to the collector electrode of the series transistor and the other end of the shunting resistor is connected to the emitter electrode. Thus a current path is provided from the positive input terminal 12 to the negative input terminal 10 and enough current can flow through the voltage reference networks of the differential comparator amplifier to cause that amplifier to become operative when the short circuit condition is corrected.

As soon as the comparator amplifier becomes operative a forward bias is again applied to the series transistor 48 in a manner previously described and current begins to pass through that transistor. The full potential of the unregulated voltage source applied between the input terminals 10 and 12 is then no longer applied to the solenoid 61 and the switch 63 opens. This removes the resistor 62 from the circuit. In this manner any detrimental effects which might be caused by having the shunting resistor 62 always in the circuit are avoided. It is of course to be realized that the switch 63 could easily be replaced by a manually operated reset mechanism whereby the voltage regulator would be placed back in operation following the correction of a short circuit condition by momentarily manually closing the switch 63.

While it is to be understood that the circuit specifications of the voltage regulator of the present invention may vary according to the design for any particular application, the following circuit specifications for the circuit of Fig. 2 to give a regulated 30 volt output voltage for an unregulated 38 volt input voltage are included by way of example only.

| | |
|---|---|
| Transistor 48 | Minneapolis Honeywell Type H5 (4 in parallel). |
| Transistors 20 and 23 | General Electric Type 2N44. |
| Transistor 76 | Hughes Type H5003. |
| Transistor 94 | Minneapolis Honeywell Type H2. |
| Diode 26 | National Semiconductor Type 1N475 (3 in series). |
| Diode 38 | National Semiconductor Type 1N475. |
| Diode 86 | National Semiconductor Type 1N468. |
| Fuse 60 | 8AG—¾ amp. (4 in parallel). |
| Capacitor 70 | 1000 microfarads. |
| Capacitor 72 | 0.001 microfarad. |
| Resistor 30 | 9,100 ohms. |
| Resistor 34 | 18,000 ohms. |
| Resistor 36 | 5,000 ohms. |
| Resistor 40 | 10,000 ohms. |
| Resistor 46 | 2,000 ohms. |
| Resistor 62 | 50 ohms. |
| Resistor 74 | 100 ohms. |
| Resistor 82 | 3,300 ohms. |
| Resistor 90 | 20,000 ohms. |
| Resistor 98 | 1,200 ohms. |
| Resistor 102 | 15 ohms. (4 in parallel). |

There has thus been disclosed a voltage regulator utilizing a semiconductor signal amplifier to provide control functions and which has the distinct advantage of providing protection for the series transistor in the regulator in the event of a short circuit condition at the output terminals of the regulator.

I claim:

1. A voltage regulator comprising, a pair of signal input terminals, a pair of signal output terminals, a transistor connected in series between one of said pair of signal input terminals and one of said pair of signal output terminals for controlling the current flow therebetween, a first network including a low impedance element connected between said signal output terminals for providing a first point of reference potential of low impedance which varies in accordance with variations in the potential difference between said signal output terminals, a second network connected between said signal output terminals for providing a second point of reference potential which is substantially constant in spite of variations in the potential difference between said signal output terminals and which is zero when the potential difference between said signal output terminals is zero, a differential comparator amplifier including a plurality of transistors connected to conduct through a common resistor and coupled to said first and second points of reference potential for providing an error signal representative of variations in the potential difference between said signal output terminals, and an error signal amplifier coupled between said comparator amplifier and said transistor for controlling the current flow through said transistor in response to said error signals and for rendering said transistor nonconductive when the potential difference between said signal output terminals becomes zero, whereby said transistor is protected from a current overload in the event of a direct short of the signal output terminals.

2. A voltage regulator as defined in claim 1 wherein said second network includes an impedance element and a Zener diode connected in series, said second point of reference potential being the common junction of said element and diode.

3. A voltage regulator comprising, a pair of signal input terminals, a pair of signal output terminals, a transistor connected in series between one of said signal input terminals and one of said signal output terminals, a first impedance element connected in parallel with said transistor, a first network connected between said output terminals for providing a first point of reference potential which varies in accordance with variations in the potential difference between said output terminals, a second network connected between said output terminals for providing a second point of reference potential which is substantially constant in spite of variations in the potenial difference between said output terminals and which is zero when the potential difference between said output terminals is zero, a comparator amplifier including a first and a second transistor connected to said first and second points of reference potential to conduct through a common resistor for providing error signals representative of variations in the potential difference between said output terminals, and an error signal amplifier connected between said transistor and said comparator amplifier for changing the current flow through said transistor inversely with changes in the potential difference between said output terminals and for rendering said transistor nonconductive when the potential difference between said output terminals becomes zero, whereby said transistor is protected from current overload in the event said output terminals are short circuited.

4. A voltage regulator as defined in claim 3 wherein said second network includes a second impedance element and a Zener diode connected in series; said second point of reference potential being the junction of said second impedance element and diode.

5. A voltage regulator comprising, first and second signal input terminals adapted to have an unregulated voltage applied therebetween, first and second output terminals, a transistor having base, collector and emitter electrodes and having its collector-emitter circuit connected in series between said first input terminal and said first output terminal, a first impedance element connected in parallel with the collector-emitter circuit of said transistor, a first voltage divider network connected between said output terminals for providing a first point of reference potential which varies in accordance with variations in the potential difference between said output terminals, a second network connected between said output terminals for providing a second point of reference potential which is substantially constant in spite of variations in the potential difference between said output terminals, a differential comparator amplifier including two transistors and connected to said first and second points of reference potential for providing a signal representative of the potential difference between said output terminals, and a signal amplifier having a signal input circuit coupled to said comparator amplifier and a signal output circuit connected to said base electrode for changing the current flow through said transistor inversely with changes in the potential difference between said output terminals and for rendering said transistor nonconductive when the potential difference between said output terminals becomes zero.

6. A voltage regulator as defined in claim 4 wherein said first signal input terminal is adapted to receive a positive input voltage and said transistor is a PNP junction transistor having its emitter electrode connected to said first input terminal.

7. A voltage regulator comprising, first and second signal input terminals, first and second signal output terminals, a transistor having base, collector and emitter electrodes and having its collector-emitter circuit connected in series with said first input terminal and said first output terminal, a first resistor connected to said collector-emitter circuit, means including a solenoid coupled to two of said terminals including one of said output terminals for selectively connecting said resistor in parallel with the collector-emitter circuit of said transistor in response to the potential differences between said output terminals becoming zero, a first resistive network connected between said output terminals for providing a first point of reference potential representative of variations in the potential difference between said output terminals, a second network connected between said output terminals and including a Zener diode for providing a second point of reference potential which is substantially constant in spite of variations in the potential difference between said output terminals, a first amplifier connected to said first and second points of reference potential for providing a signal which is representative of the potential difference between said output terminals, a second amplifier having a signal input circuit coupled to said first amplifier and a signal output circuit coupled to said base electrode for controlling the current flow through said transistor in response to said signals and for rendering said transistor nonconductive when the potential difference between said output terminals becomes zero, whereby said transistor is protected from excessive current flow in the event of a direct short circuiting of the output terminals and whereby said regulator is automatically rendered operative again when said short circuiting has been removed.

References Cited in the file of this patent

UNITED STATES PATENTS

| | | |
|---|---|---|
| 1,749,568 | Davis | Mar. 4, 1930 |
| 2,693,568 | Chase | Nov. 2, 1954 |
| 2,769,135 | Keiper | Oct. 30, 1956 |
| 2,776,382 | Jensen | Jan. 1, 1957 |
| 2,889,512 | Ford et al. | June 2, 1959 |